US008888045B2

(12) United States Patent
Boren et al.

(10) Patent No.: US 8,888,045 B2
(45) Date of Patent: Nov. 18, 2014

(54) APPARATUS FOR A NO TOUCH LAVATORY DOOR

(71) Applicant: The Boeing Company, Chicago, IL (US)

(72) Inventors: Kelly L. Boren, Marysville, WA (US); Eric Karl Satermo, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/741,976

(22) Filed: Jan. 15, 2013

(65) Prior Publication Data

US 2014/0196372 A1 Jul. 17, 2014

(51) Int. Cl.
*B64C 1/14* (2006.01)

(52) U.S. Cl.
USPC .................................... 244/129.5; 244/118.5

(58) Field of Classification Search
USPC .......... 49/25; 244/118.5, 129.4, 129.5; 52/64, 52/65, 174; 109/59 R, 59 T, 64, 73; 296/24.3; 292/341.17
See application file for complete search history.

(56) References Cited

U.S. PATENT DOCUMENTS

| | | | | |
|---|---|---|---|---|
| 4,741,275 | A * | 5/1988 | Lewiner et al. | 109/7 |
| 4,994,722 | A | 2/1991 | Dolan et al. | |
| 5,932,982 | A | 8/1999 | Pezzelli, Jr. | |
| 6,615,414 | B2 * | 9/2003 | Miller et al. | 4/321 |
| 6,696,979 | B2 * | 2/2004 | Manten et al. | 340/945 |
| 6,702,231 | B2 * | 3/2004 | Ward | 244/118.5 |
| 7,364,119 | B2 * | 4/2008 | Sprenger et al. | 244/118.6 |
| 7,741,801 | B2 * | 6/2010 | Fukuizumi | 318/480 |
| 7,984,875 | B2 * | 7/2011 | Koehn et al. | 244/118.5 |
| 8,141,296 | B2 | 3/2012 | Bem | |
| 2003/0047648 | A1 * | 3/2003 | Batt et al. | 244/118.5 |
| 2003/0066931 | A1 * | 4/2003 | Ward | 244/118.5 |
| 2004/0227034 | A1 * | 11/2004 | Wentland et al. | 244/119 |
| 2005/0116098 | A1 * | 6/2005 | Martens et al. | 244/118.5 |
| 2005/0230550 | A1 * | 10/2005 | Dominguez | 244/129.5 |
| 2009/0065641 | A1 * | 3/2009 | Koehn et al. | 244/118.5 |
| 2009/0237254 | A1 * | 9/2009 | Munro et al. | 340/572.1 |
| 2010/0007463 | A1 * | 1/2010 | Dingman et al. | 340/5.72 |

(Continued)

FOREIGN PATENT DOCUMENTS

| | | |
|---|---|---|
| DE | 102008014520 | 11/2008 |
| DE | 102012104750 | 12/2013 |

(Continued)

OTHER PUBLICATIONS

International Search Report and Written Opinion dated Mar. 10, 2014 in co-pending PCT Patent Application No. PCT/US2013/074513.

*Primary Examiner* — Jerry Redman
(74) *Attorney, Agent, or Firm* — Joseph M. Rolnicki; Evans & Dixon, LLC

(57) ABSTRACT

A no touch lavatory has a first sensor outside the lavatory that is operable to cause a motor assembly to open the door of the lavatory in response to a person making a motion in close proximity to the first sensor, a second sensor inside the lavatory that causes the motor assembly to close the door and causes a lock to lock the door in response to the second sensor detecting the person entering the lavatory, and a third sensor inside the lavatory that causes the lock to unlock the door and causes the motor assembly to open the door in response to the third sensor detecting a motion made by the person inside the lavatory.

19 Claims, 6 Drawing Sheets

(56) References Cited

U.S. PATENT DOCUMENTS

| | | | | |
|---|---|---|---|---|
| 2010/0186162 | A1* | 7/2010 | Leonard | 4/664 |
| 2010/0237635 | A1* | 9/2010 | Ieda et al. | 292/336.3 |
| 2010/0253516 | A1 | 10/2010 | Lemerand et al. | |
| 2010/0264940 | A1* | 10/2010 | Tsuchida et al. | 324/679 |
| 2011/0012378 | A1* | 1/2011 | Ueno et al. | 292/336.3 |
| 2011/0260496 | A1* | 10/2011 | Yano | 296/146.9 |
| 2011/0260831 | A1* | 10/2011 | Ieda et al. | 340/5.64 |
| 2011/0316703 | A1* | 12/2011 | Butler et al. | 340/573.1 |
| 2012/0119029 | A1* | 5/2012 | Tappe et al. | 244/118.5 |
| 2012/0234621 | A1* | 9/2012 | Syvret et al. | 180/281 |
| 2013/0002419 | A1* | 1/2013 | Lee | 340/457 |
| 2013/0079984 | A1* | 3/2013 | Aerts et al. | 701/36 |
| 2013/0097940 | A1* | 4/2013 | Brown et al. | 49/506 |
| 2013/0099523 | A1* | 4/2013 | Brown et al. | 296/146.9 |
| 2013/0099524 | A1* | 4/2013 | Brown et al. | 296/146.9 |
| 2013/0107557 | A1* | 5/2013 | Dingman et al. | 362/501 |
| 2013/0239321 | A1* | 9/2013 | Reeder et al. | 4/615 |
| 2014/0035302 | A1* | 2/2014 | Koch et al. | 292/341.17 |

FOREIGN PATENT DOCUMENTS

| | | | |
|---|---|---|---|
| JP | 2007-241446 | * | 9/2007 |
| JP | 2008-267104 | * | 11/2008 |
| KR | 2002-0092578 | * | 12/2002 |
| KR | 10-0821934 | * | 4/2008 |

* cited by examiner

APPARATUS FOR A NO TOUCH LAVATORY DOOR

FIELD OF THE INVENTION

The present invention pertains to no-touch doors, such as aircraft lavatory doors. In particular, the present invention pertains to an aircraft lavatory having a first sensor outside the lavatory that is operable to cause a motor assembly to open the door of the lavatory in response to a person making a motion in close proximity to the first sensor, a second sensor inside the lavatory that causes the motor assembly to close the door and causes a lock mechanism to securely lock the door in the closed position in response to the second sensor detecting the person entering the lavatory, and a third sensor inside the lavatory that causes the lock to unlock the door and causes the motor assembly to open the door in response to the third sensor detecting a motion made by the person inside the lavatory.

BACKGROUND

Public spaces such as lavatories are potential health hazards. The direct human contact with surfaces can leave behind germs and viruses which may contact a subsequent user thereby transmitting these unwanted germs or viruses to others. It would be beneficial to reduce direct human contact with lavatory structures in an effort to reduce transmission of germs or viruses from lavatory structures to humans.

SUMMARY

The apparatus of the invention is designed to reduce the potential for germ transmission by providing a highly visible passenger wellness feature in the form of a no touch lavatory door.

The apparatus may include an electrical lock between the lavatory door and doorway that is operable to selectively lock and unlock the door in the doorway, and a motor assembly between the door and doorway that is operable to selectively open and close the door.

A first sensor of the apparatus is positioned outside the lavatory. The first sensor is operable to output an enter command to the motor assembly to cause the motor assembly to open the door in response to the first sensor detecting a signal from a person standing outside lavatory.

The apparatus also includes a second sensor inside the lavatory. The second sensor is operable to output an occupied command to the motor assembly to cause the motor assembly to close the door in the doorway in response to the second sensor detecting a person entering the lavatory through the doorway. The second sensor is also operable to output the occupied command to the lock to cause the lock to lock the door after the motor assembly has closed the door in response to the second sensor detecting the person entering the lavatory.

The apparatus also includes a third sensor inside the lavatory. The third sensor is operable to output an exit command to the lock to cause the lock to unlock in response to the third sensor detecting a signal from the person inside the lavatory. The third sensor is also operable to output the exit command to the motor assembly to cause the motor assembly to open the door after the lock has been unlocked in response to the third sensor detecting the signal from the person inside the lavatory.

The second sensor of the apparatus is also operable to output an unoccupied command to the motor assembly to cause the motor assembly to close the door in the doorway in response to the second sensor detecting the person exiting the lavatory through the doorway. Furthermore, the first sensor is operable to output the enter command to the motor assembly to cause the motor assembly to open the door only when the second sensor outputs the unoccupied command.

A method of opening a lavatory door without physical contact by the user is also provided. The method includes detecting a movement of an object of a user by a sensor located within a cavity located on the lavatory. The sensor, upon detecting the movement of the object, sends a signal to a motor assembly configured to operate a motor. The motor operating to open a door on the lavatory from a close position to an open position.

BRIEF DESCRIPTION OF THE DRAWINGS

Further features of the apparatus of the invention are set forth in the following description of the apparatus and in the drawing figures.

DESCRIPTION

Figure 1:
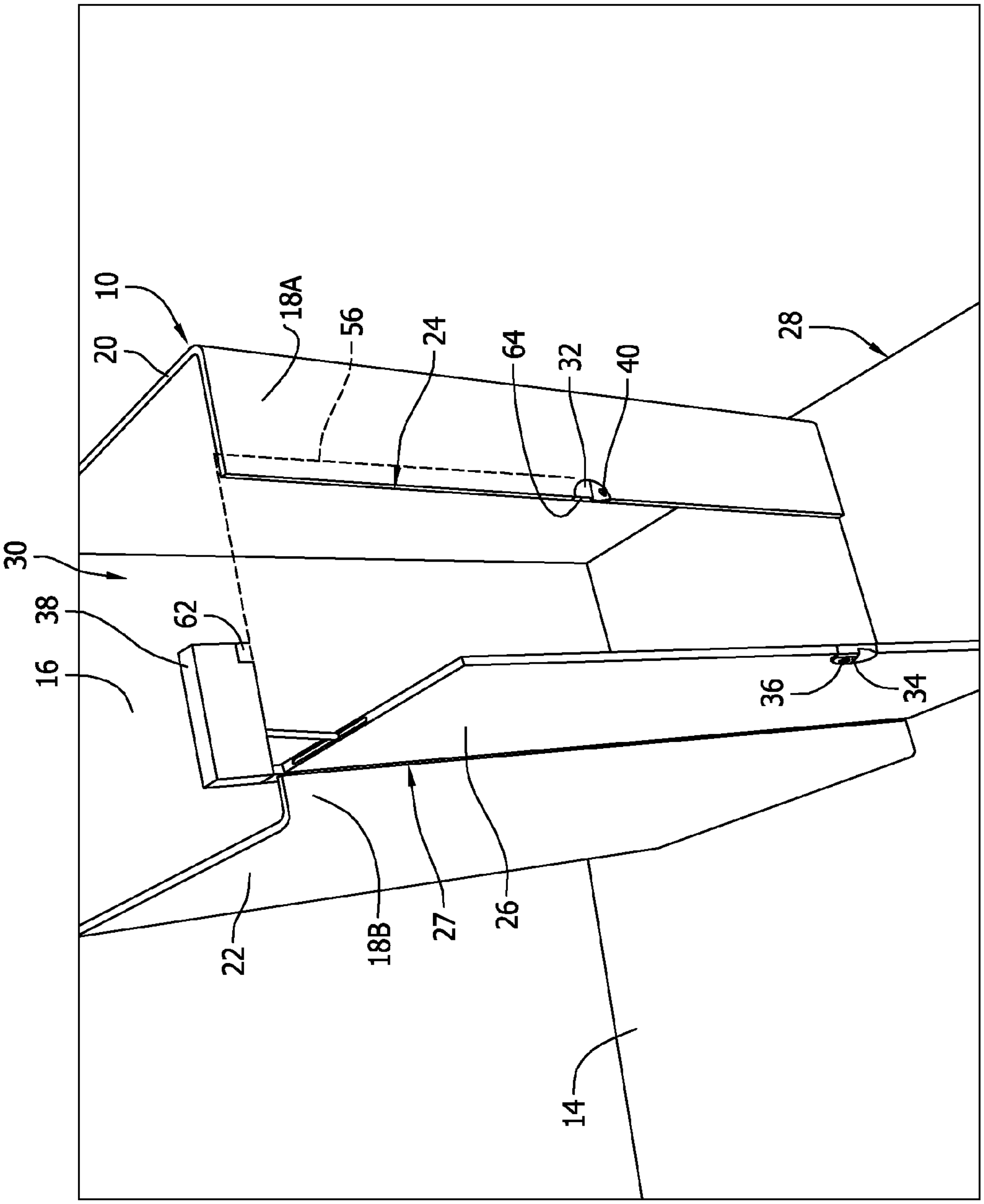
FIG. 1 is a representation of a portion of a lavatory of the invention.
Figure 2:
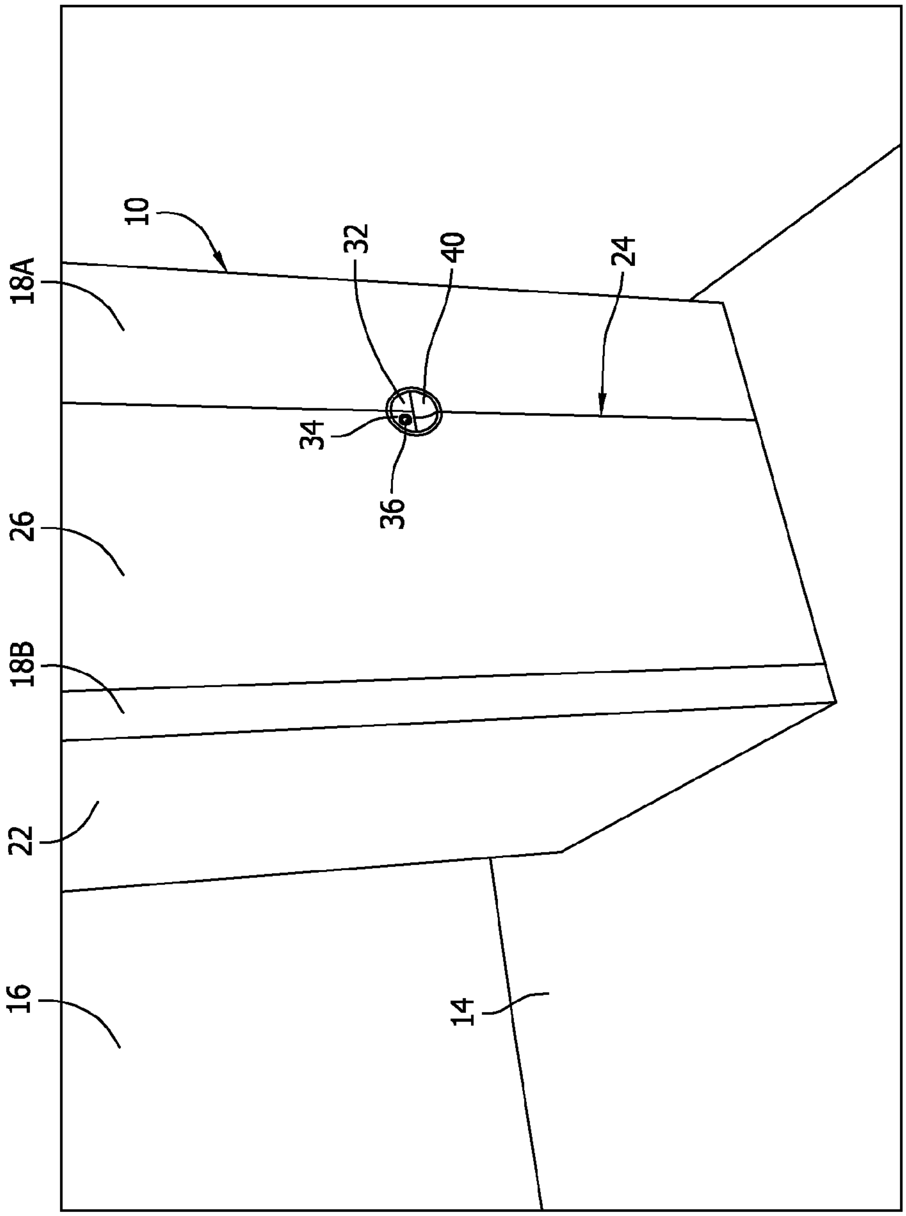
FIG. 2 is an enlarged view of the lavatory of FIG. 1.

Referring to FIG. 1, a representation of a lavatory 10 of the invention is shown. The lavatory 10 includes an enclosure positioned on a floor surface 14. The enclosure is comprised of a rear wall 16, front wall having a first front wall section 18A and a second front wall section 18B, first sidewall 20 and a second sidewall 22. The first sidewall 20 extends between the first front wall section 18A and the rear wall 16. The second sidewall 22 extends between the second front wall section 18B and the rear wall 16. Although not shown in FIG. 1, the lavatory enclosure also includes a ceiling panel that extends over the lavatory.

A doorway 24 in the front wall divides the front wall into the two sections 18A, 18B. A door 26 is positioned in the doorway 24. The door 26 is connected by a hinge assembly 27 to the aft front wall section 18B for pivoting movement of the door between opened and closed positions relative to the doorway 24. In the embodiment of the lavatory 10 shown in the drawing figures, and in particular FIG. 1, the door 26 pivots out to the exterior 28 of the lavatory to its open position to provide access to the interior 30 of the lavatory through the doorway 24.

Figure 3:
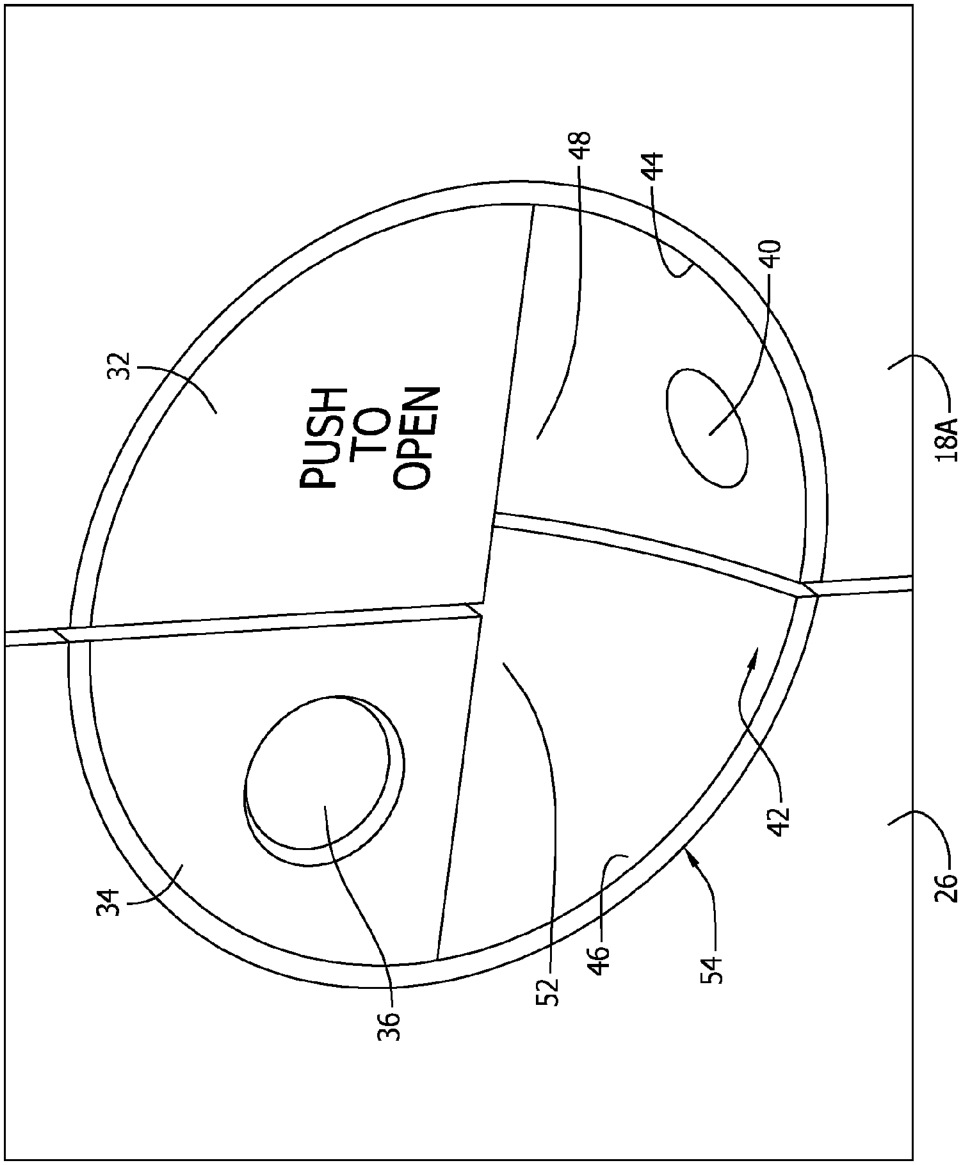
FIG. 3 is a perspective view of a sensor of the invention.
Figure 4:
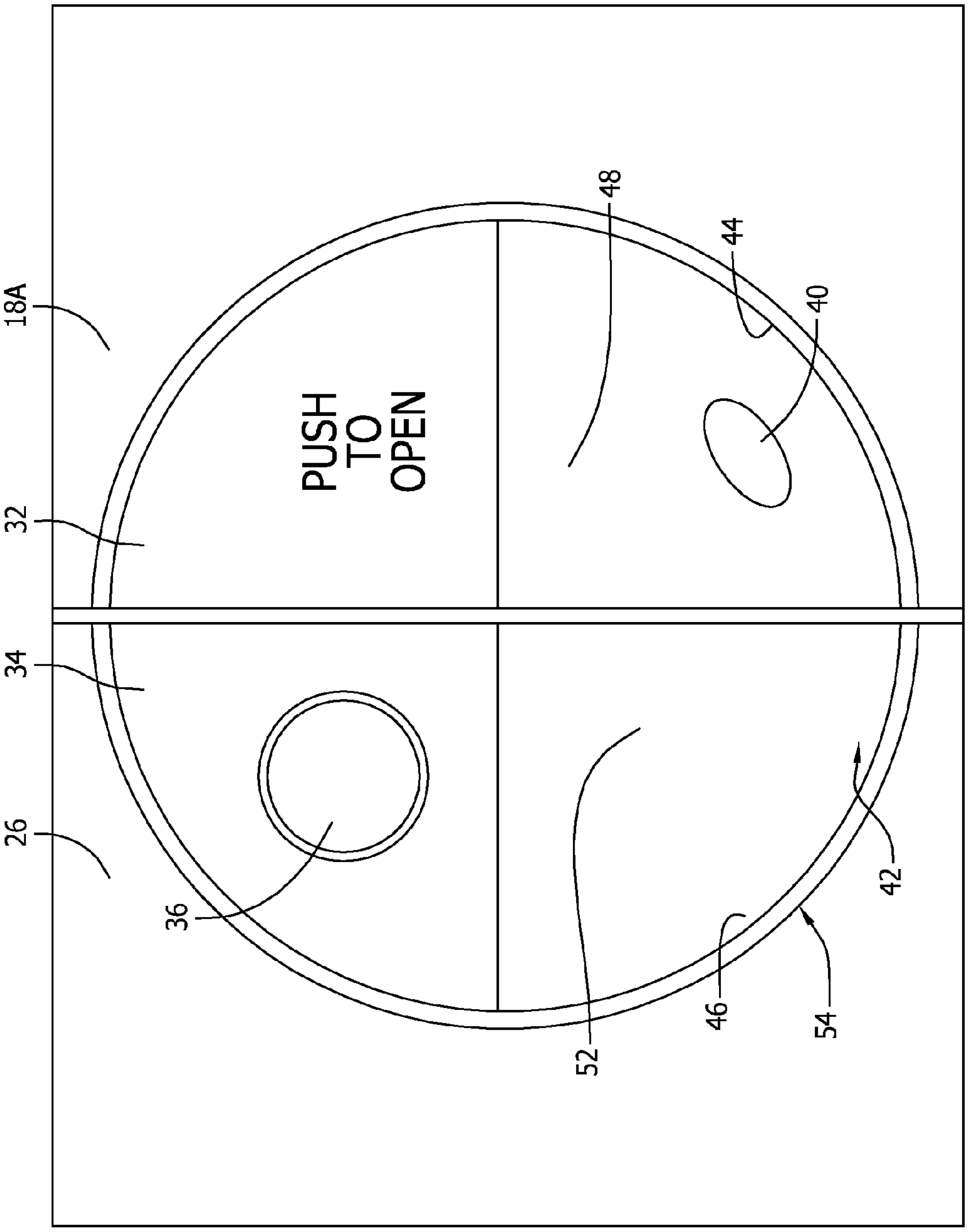
FIG. 4 is a front view of the sensor of FIG. 3.

A lock mechanism is provided between the lavatory front wall and the door 26. Referring to FIGS. 3 and 4, the lock mechanism includes a first part 32 that is mounted in the first front wall section 18A and a second part 34 that is mounted in the lavatory door 26. The lock mechanism may be an electrically operated lock mechanism that is selectively operable to lock the door 26 in the doorway 24 and to unlock the door. The first part 32 of the lock mechanism could include a rotary electric motor or a solenoid that is operable to selectively move a latch of the lock mechanism into and out of a strike plate on the second part 34 of the lock mechanism. A visual indicator 36 may be provided on the lavatory to indicate the locked or unlocked status of the lock and thereby respectively indicates whether the lavatory is occupied or unoccupied. In FIGS. 3 and 4 the indicator 36 is represented on the second part 34 of the lock mechanism, however the indicator 36 may be positioned elsewhere on the lavatory. In a further embodiment of the lavatory, the lock mechanism could include a mechanical device to lock and unlock the door should power to the electric lock mechanism be interrupted. For example, the lock first part 32 could be pushed inward by a person's elbow to unlock the door.

Referring to FIG. 1, the lavatory of the invention also comprises a motor assembly 38 that is operatively connected between the lavatory second front wall section 18B and the lavatory door 26. The motor assembly 38 is operable to selectively move the door 26 to its open position out of the doorway 24, and its closed position in the doorway. The motor assembly 38 is electrically operated and could include a rotary motor, a solenoid motor or some other type of motor that is operable to selectively open and close the door 26. Other types of motor assemblies that are not electrically operable could also be used.

The apparatus of the invention may further include a first electronic sensor 40 outside the lavatory 10. Referring to FIGS. 3 and 4, a cavity 42 having a half circle configuration is shown recessed into both the first front wall section 18A and the lavatory door 26. The cavity 42 half circle configuration complements the half circle configuration of the lock first part 32 and the lock second part 34. Together, the lock first part 32, the lock second part 34 and the cavity 42 have an aesthetically pleasing circular appearance. In other embodiments other configurations of the lock first part 32, the lock second part 34 and the cavity 42 could be used. The half circle configuration of the cavity 42 is defined by a first cavity sidewall 44 and a second cavity sidewall 46. The first cavity sidewall 44 has a general quarter-circle configuration that extends generally horizontally into the first front wall section 18*a* from the generally vertical surface of the first front wall section. The second cavity sidewall 46 also has a general quarter-circle configuration that extends generally horizontally into the door 26 from a generally vertical surface of the door. The first cavity sidewall 44 extends into the first front wall section 18*a* to a quarter-circle shaped backwall section 48 of the cavity. The second cavity sidewall 46 extends into the door 26 to a quarter-circle shaped second backwall section 52. Together, the first 44 and second 46 cavity sidewalls and the first 48 and second 52 cavity backwall sections define the cavity 42. Generally horizontal bottom surfaces of the lock first part 32 and the lock second part 34 define the top of the cavity 42.

Figure 5:
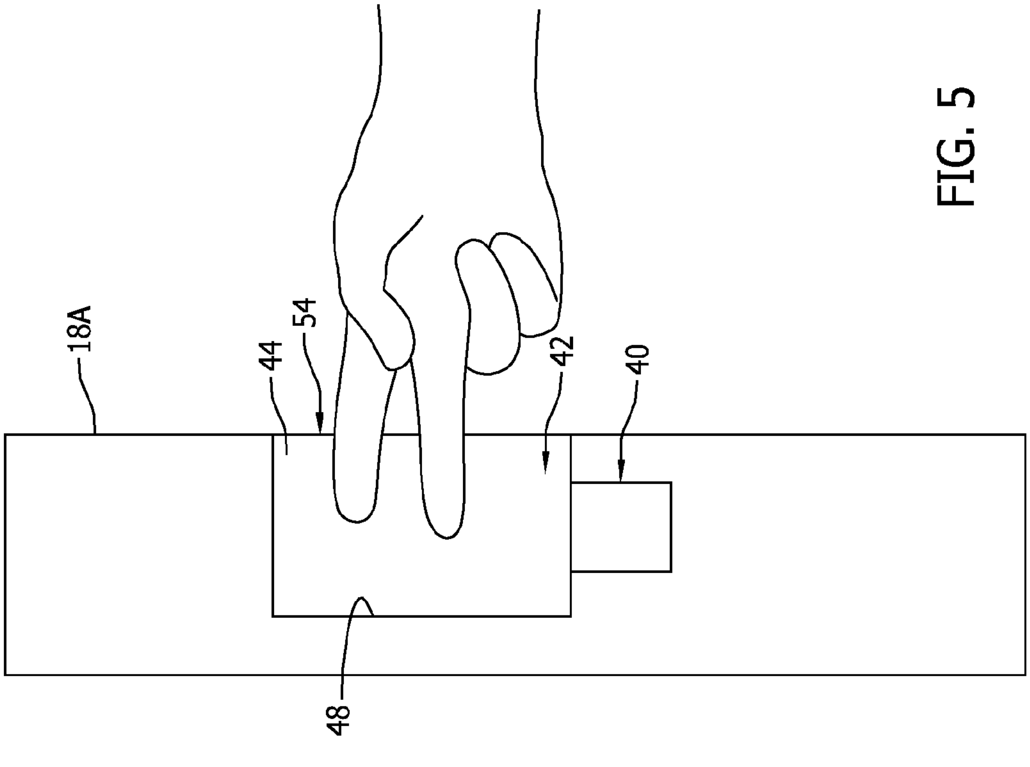
FIG. 5 is a representation of a cross-section view of FIG. 3.

The first 44 and second 46 cavity sidewalls and the first 32 and second 34 lock parts surround a front opening 54 to the cavity 42. The first sensor 40 is positioned inside the cavity 42. As shown in FIG. 5, the first sensor 40 is positioned on the first cavity sidewall 44 behind the front opening 54 and between the opening 54 and the first cavity backwall section 48. In other embodiments, the first sensor 40 could be positioned on other surfaces that define the cavity 42. Furthermore, in other embodiments the cavity 42 could be formed in only one of the first front wall section 18A or the door 26. The first sensor 40 communicates electronically with the motor assembly 38 as represented by the dashed lines 56 in FIG. 1. The first sensor 40 could be an optic sensor, a heat sensor or some other equivalent type of sensor. The sensor 40 is operable to output an enter command to the motor assembly 38 to cause the motor assembly to open the door 26 in the doorway 24 in response to the first sensor 40 detecting a signal inside the cavity 42 from a person outside the lavatory. For example, the signal could be an optic signal produced by the person swiping their fingers over the first sensor 40 as shown in FIG. 5, or a heat signal produced by the person positioning their fingers in close proximity to the first sensor 40 as shown in FIG. 5.

The first sensor 40 is positioned in the cavity 42 to avoid unintended operation of the first sensor 40. With the first sensor 40 positioned in the first cavity sidewall 44 and directed into the cavity 42, a person or object passing by the cavity opening 54 would not be detected by the first sensor 40. In some embodiments the arrangement of the first sensor 40 may be described as being substantially orthogonally disposed to the desired operational movement of a user, thereby having an advantage of unintended operation by an object located or moving in a plane substantially spatially parallel thereto, such as a passerby or a galley cart.

The apparatus also includes a second electronic sensor 62 inside the lavatory 10. The second sensor 62 also communicates electronically with the motor assembly 38. In addition, the second sensor 62 is in electronic communication with the lock mechanism first part 32 as represented by the dashed lines 56 in FIG. 1. In FIG. 1 the second sensor 62 is represented as being on the motor assembly 38. In other embodiments the second sensor 62 could be positioned at some other location inside the lavatory 10. Like the first sensor 40, the second sensor 62 could be an optic sensor, a heat sensor, or some other equivalent type of sensor. The second sensor 62 is operable to output an occupied command to the motor assembly 38 to cause the motor assembly to close the door 26 in the doorway 24 in response to the second sensor 62 detecting a person entering the lavatory through the doorway 24. The second sensor 62 is also operable to output the occupied command to the lock mechanism first part 32 to cause the lock mechanism to lock the door 26 in the doorway 24 to the first front wall section 18A after the motor assembly 38 has closed the door in the doorway. The second sensor 62 outputting the occupied command to the lock mechanism first part 32 also causes the visual indicator 36 on the lock mechanism second part 34 to indicate that the lavatory is now occupied. The occupied command output by the second sensor 62 to the motor assembly 38 also prevents the motor assembly from opening the door 26 in response to an enter command being output by the first sensor 40.

The apparatus also includes a third electronic sensor 64 inside the lavatory 10. In the example shown in FIG. 1, the third sensor 64 is positioned on the interior of the lavatory first front wall section 18A on the opposite side of the wall from the first sensor 40. The third sensor 64 communicates electronically with the motor assembly 38 represented by the dashed line 56. As with the first 40 and second 62 sensors, the third sensor 64 could be an optic sensor, a thermal sensor or some other equivalent type of sensor. The third sensor 64 is operable to output an exit command to the lock mechanism 32 to cause the lock mechanism to unlock the door 26 from the first front wall section 18A and to output the exit command to the motor assembly 38 to cause the motor assembly to open the door 24 in response to the third sensor 64 detecting a signal from the person inside the lavatory. This enables the person inside the lavatory to exit the lavatory. Additionally, the third sensor 64 could also be operable to lock the lock mechanism 32 when the door is closed by the motor assembly instead of the second sensor 62. The second sensor 62 would then be operable only to close the door when a person enters the lavatory. The third sensor may also be assembled and configured to operate similar to the first sensor in that the third sensor is positioned in a cavity and configured to detect a motion of a users finger or another object when the finger or object is inserted or moved within a cavity located on the lavatory door or wall section. The sensor may be orthogonally disposed to the desired operational movement of a user, thereby having an advantage of unintended operation by the user in the confined space of the lavatory.

The second sensor 62 is also operable to output an unoccupied command to the motor assembly 38 and the lock mechanism second part 34 in response to the second sensor detecting the person exiting the lavatory through the doorway 24. The unoccupied command output by the second sensor 62 to the motor assembly 38 causes the motor assembly to close the door 24 in the doorway. The unoccupied command output by a second sensor to the lock mechanism second part 34 causes the visual indicator 36 to indicate that the lavatory is unoccupied.

As described above, the lavatory 10 is a no touch lavatory. With the lavatory unoccupied, a person outside the lavatory can position their fingers or other object inside the cavity 42 and move their fingers or object by or position their fingers in close proximity to the first sensor 40. The first sensor 40 will then output the enter command to the motor assembly 38 and cause the motor assembly to open the door 26 in response to the first sensor detecting the signal inside the cavity 42 from the person outside the lavatory. As the person enters the lavatory, the second sensor 62 inside the lavatory outputs the occupied command to the motor assembly 38 to cause the motor assembly to close the door 26 in the doorway 24 in response to the second sensor detecting the person entering the lavatory through the doorway. The second sensor 62 also outputs the occupied command to the lock mechanism 32 to cause the lock mechanism to lock the door 26 in the doorway 24 to the first front wall section 18A in response to the second sensor detecting the person entering the lavatory through the doorway. In addition, the visual indicator 36 outside the lavatory is changed to indicate that the lavatory is now occupied. With the lavatory occupied, the first sensor 40 is disabled from outputting an enter command to the motor assembly 38.

When the person desires to exit the lavatory 10, the person can move their hand in front of or position their hand in close proximity to the third sensor 64. The third sensor is then operable to output an exit command to the lock mechanism 32 to cause the lock mechanism to unlock the door 26 from the front wall first section 18A in response to the third sensor detecting the signal from the person inside the lavatory. The third sensor is also operable to output the exit command to the motor assembly 38 to cause the motor assembly to open the door in response to the detected signal from the person inside the lavatory.

After the person exits the lavatory through the doorway 24, the second sensor 62 is operable to output an unoccupied command to the motor assembly to cause the motor assembly 38 to move the door 26 to the closed position in the doorway 24 in response to the second sensor detecting the person exiting the lavatory through the doorway. The unoccupied command is also output by the second sensor 62 to the lock mechanism 32 to cause the visual indicator 36 to change from the occupied indication to the unoccupied indication.

Figure 6:
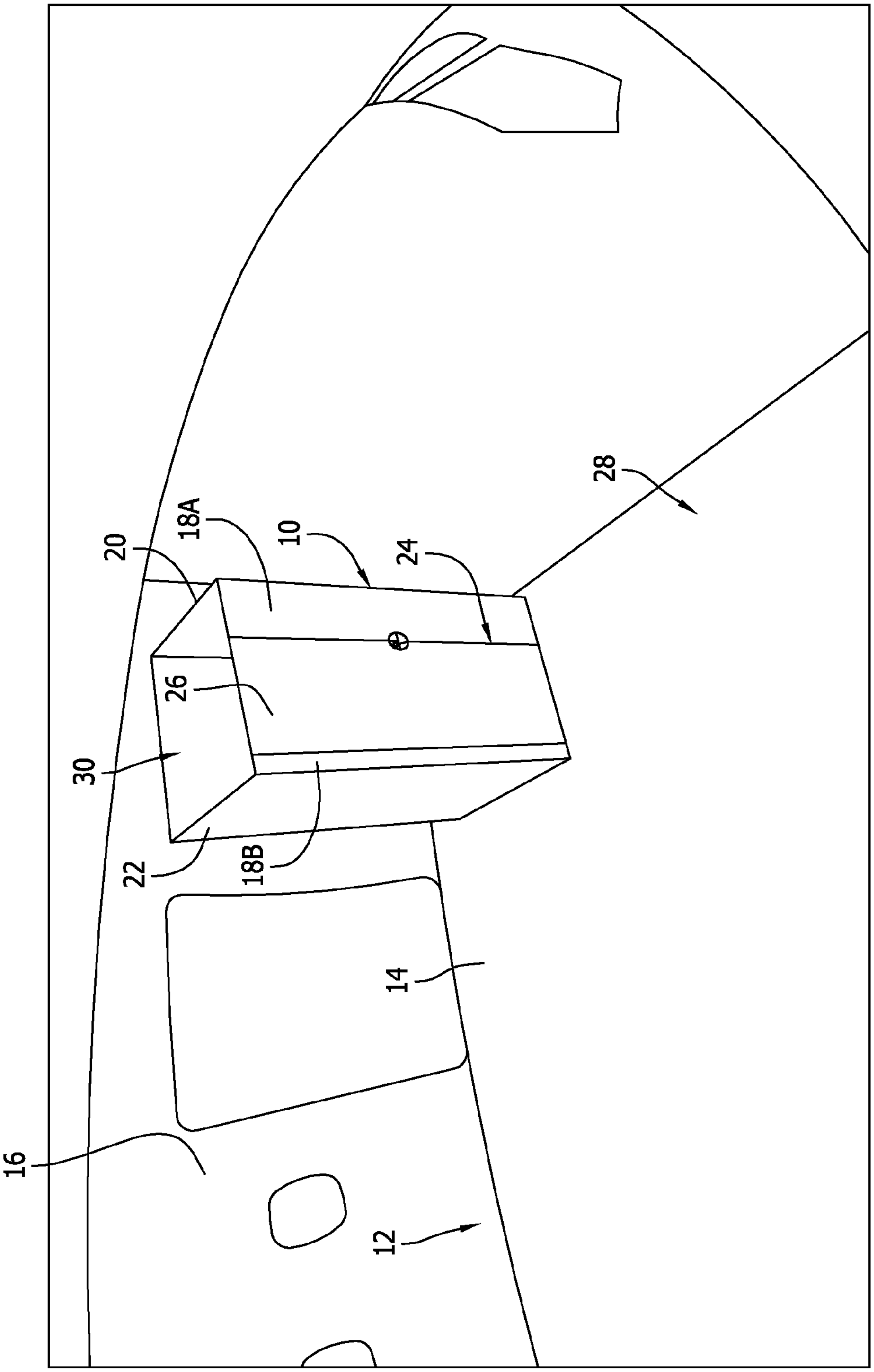
FIG. 6 is a representation of a portion of an aircraft cabin and the lavatory of the invention.

FIG. 6 shows a representation of the lavatory of the invention employed on an aircraft. The lavatory 10 is positioned on the floor surface 14 of the aircraft cabin and against an outboard sidewall of the aircraft cabin. The outboard sidewall becomes the rear wall of the lavatory enclosure. The remaining structure of the lavatory is the same as that previously described. The positioning of the lavatory 10 in the aircraft cabin 12 shown in FIG. 6 is only one example of where the lavatory could be located in the aircraft. In other embodiments the lavatory 10 could be located in other areas of the aircraft.

The foregoing description has described embodiments directed to aircraft applications and to lavatories. However, certain principles of the invention are equally applicable to other embodiments where no-touch enablement is required, including doors with a high volume of human traffic such as businesses.

As various modifications could be made in the construction of the invention herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. A lavatory comprising:

an enclosure having at least one wall;

a doorway opening adjacent the wall;

a door in the doorway opening;

a cavity recessed into at least one of the door and the wall, the cavity having a cavity opening;

a first sensor inside the cavity behind the cavity opening, the first sensor being operable to detect a signal in close proximity to the first sensor inside the cavity from a person that is outside the lavatory and to output an open command in response to the signal; and, a motor assembly operatively connected to the first sensor and the door, the motor assembly being operable to open the door in the doorway opening in response to the open command output by the first sensor.

2. The lavatory of claim 1, further comprising:

the cavity being recessed into a generally vertical surface of at least one of the door and the wall.

3. The lavatory of claim 1, further comprising:

the cavity having at least one cavity sidewall extending into the cavity to a cavity backwall at an opposite side of the cavity from the cavity opening; and, the first sensor being on the cavity sidewall between the cavity opening and the cavity backwall.

4. The lavatory of claim 1, further comprising:

the first sensor being operable to detect a motion signal inside the cavity from a person outside the lavatory and to output the open command in response to the detected motion signal inside the cavity.

5. The lavatory of claim 1, further comprising:

the first sensor being operable to detect a heat signal inside the cavity from a person outside the lavatory and to output the open command in response to the detected heat signal inside the cavity.

6. The lavatory of claim 1, further comprising:

the first sensor being operatively connected to a mechanical device that is operable to control the first sensor to output the open command in response to the mechanical device being touched by a person.

7. The lavatory of claim 1, further comprising:

a sensor inside the lavatory, the sensor inside the lavatory being operable to detect a signal from a person inside the lavatory and to output lock and unlock commands in response to the signal from the person inside the lavatory; and, a lock between the wall and door, the lock being operatively connected to the sensor inside the lavatory, the lock being operable to lock the door in the doorway to the wall in response to the lock output command by the sensor inside the lavatory and to unlock the door in the doorway from the wall in response to the unlock output command by the sensor inside the lavatory.

8. The lavatory of claim 7, further comprising:

the motor assembly being operatively connected to the sensor inside the lavatory, the motor assembly being operable to open the door in the doorway in response to the unlock output command by the sensor inside the lavatory.

9. The lavatory of claim 7, further comprising:

the sensor inside the lavatory being operatively connected to a mechanical device that is operable to selectively lock and unlock the lock in response to the mechanical device being touched by a person.

10. A lavatory comprising:

an enclosure having at least one wall;

a doorway opening adjacent the wall;

a door in the doorway opening;

a lock between the door and the wall, the lock being operable to selectively lock the door in the doorway opening to the wall and unlock the door in the doorway opening from the wall;

a motor assembly operatively connected between the enclosure and the door, the motor assembly being operable to selectively open and close the door in the doorway opening;

a cavity extending into at least one of the door and the wall, the cavity being defined by at least one cavity sidewall that extends into at least one of the door and the wall;

a first sensor outside the lavatory and on the cavity sidewall inside the cavity, the first sensor being operable to detect a signal in close proximity to the first sensor inside the cavity from a person outside the lavatory and to output an enter command to the motor assembly to cause the motor assembly to open the door in the doorway in response to the first sensor detecting the signal from the person outside the lavatory; and, a second sensor inside the lavatory, the second sensor being operable to output an occupied command to the motor assembly to cause the motor assembly to close the door in the doorway and to output the occupied command to the lock to cause the lock to lock the door to the wall in response to the second sensor detecting a person entering the lavatory through the doorway.

11. The lavatory of claim 10, further comprising the cavity extending generally horizontally into a generally vertical surface of at least one of the door and the wall.

12. The lavatory of claim 10, further comprising:

a third sensor inside the lavatory, the third sensor being operable to output an exit command to the lock to cause the lock to unlock the door in the doorway and to output the exit command to the motor assembly to cause the motor assembly to open the door in the doorway in response to the third sensor detecting a signal from the person inside the lavatory.

13. The lavatory of claim 10, further comprising:

the first sensor being operable in response to the first sensor detecting a motion signal from the person outside the lavatory.

14. The lavatory of claim 13, further comprising:

a mechanical device in combination with the first sensor, the mechanical device being operable to output a mechanical command to the motor assembly to cause the motor assembly to open the door in the doorway in response to the mechanical device being contacted by the person outside the lavatory.

15. The lavatory of claim 10, further comprising:

the first sensor being operable in response to the first sensor detecting a heat signal from the person outside the lavatory.

16. The lavatory of claim 10, further comprising:

the second sensor being operable to output an unoccupied command in response to the second sensor detecting a person exiting the lavatory through the doorway; and, the first sensor being operable to output the enter command to the motor assembly to cause the motor assembly to open the door in the doorway only when the second sensor outputs the unoccupied command.

17. The lavatory of claim 16, further comprising:

the second sensor being operable to output the unoccupied command to the motor assembly to cause the motor assembly to close the door in the doorway in response to the second sensor detecting a person exiting the lavatory through the doorway.

18. The lavatory of claim 10, further comprising:

the first sensor having a visual indicator associated with the first sensor that provides visual indications to the person outside the lavatory of when the lavatory is unoccupied and occupied.

19. The lavatory of claim 10, further comprising:

the lock having a manual override outside the lavatory that is operable to manually selectively lock and unlock the door in the doorway.

* * * * *